March 2, 1965 Z. J. LANSKY ETAL 3,171,435
SOLENOID OPERATED VALVE ASSEMBLY
Filed Dec. 5, 1961 2 Sheets-Sheet 1
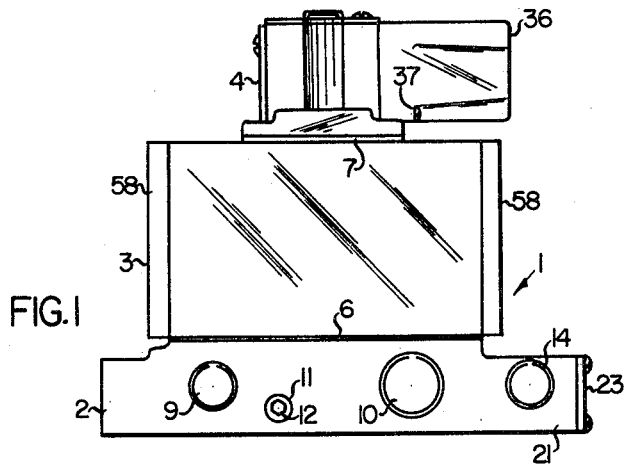
FIG.1
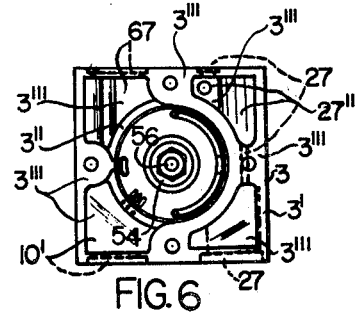
FIG.6
FIG.9
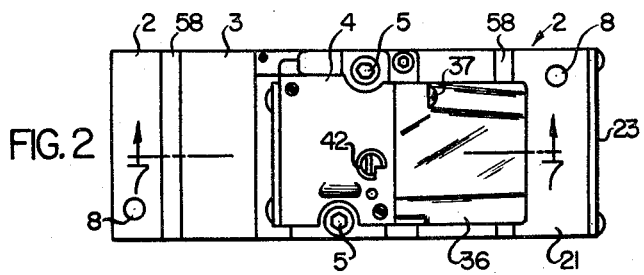
FIG.2
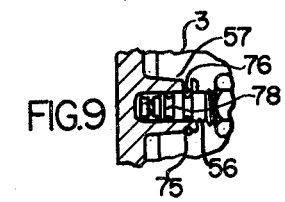
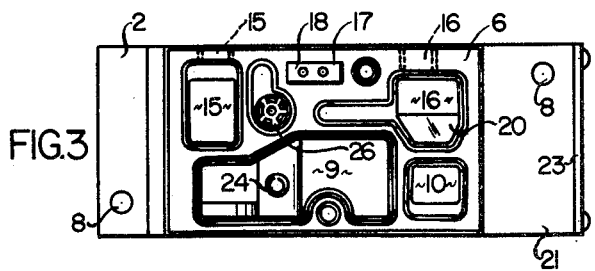
FIG.3
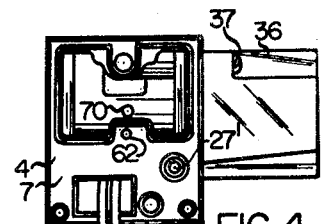
FIG.4
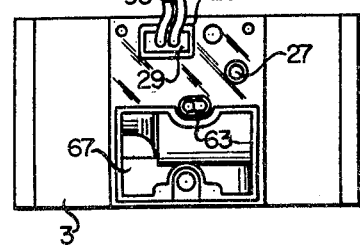
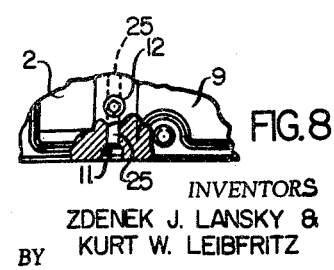
FIG.5    FIG.8
INVENTORS
ZDENEK J. LANSKY &
KURT W. LEIBFRITZ
BY
John N. Wolfram
ATTORNEY

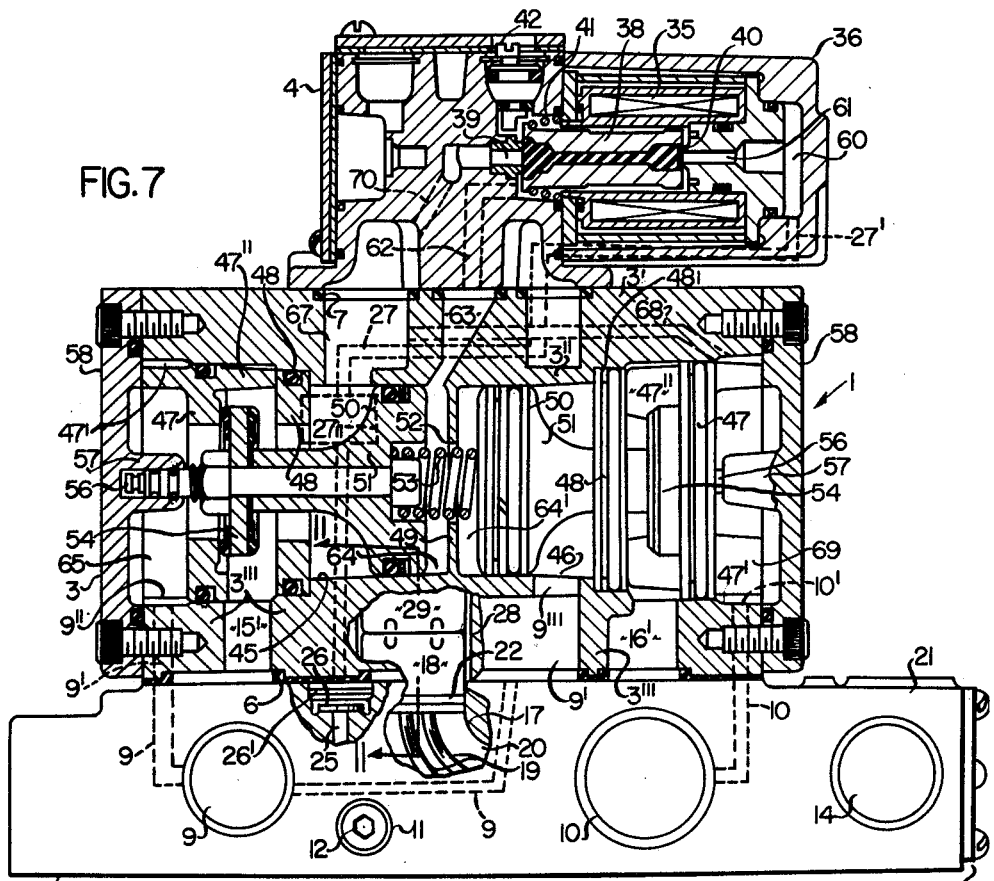
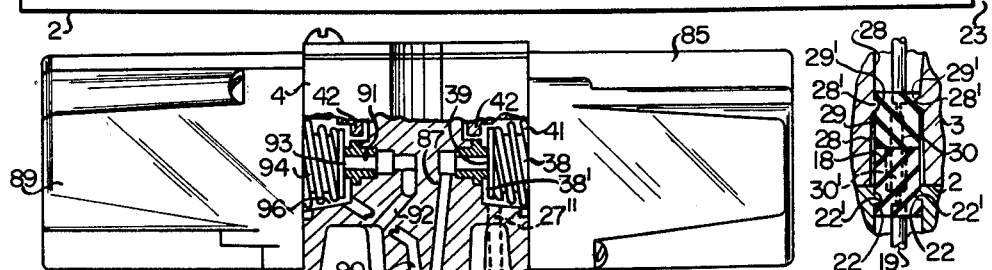
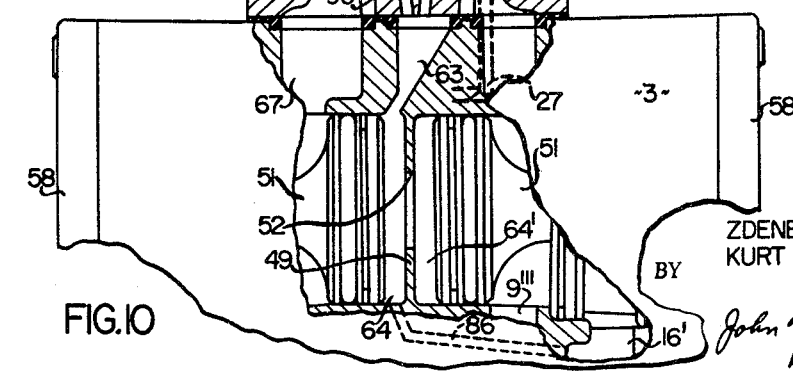

United States Patent Office 3,171,435
Patented Mar. 2, 1965

3,171,435
SOLENOID OPERATED VALVE ASSEMBLY
Zdenek J. Lansky, Winnetka, and Kurt W. Leibfritz, Norridge, Ill., assignors to Parker-Hannifin Corporation, Cleveland, Ohio, a corporation of Ohio
Filed Dec. 5, 1961, Ser. No. 157,220
19 Claims. (Cl. 137—596.16)

The present invention relates generally as indicated to a solenoid operated valve assembly and, more particularly to such valve assembly of the built-up block type wherein there is provided a base or distributing block, a valve block, and a solenoid block.

It is an object of this invention to provide a solenoid operated valve assembly of the character indicated wherein all of the fluid system piping and the electrical supply line for solenoid operation are connected to the base or distributing block of the assembly, whereby servicing or replacement of the valve and solenoid blocks may be easily effected without disturbing the piping and electrical connections to the distributing block, and wherein a floating electrical plug connection is made between complemental electric plug elements carried by the distributing and valve blocks respectively, such floating connection permitting alignment of the plug elements without strain and preventing vibration failure thereof.

It is another object of this invention to provide a pilot-operated solenoid valve assembly wherein the pilot valve is mounted in the solenoid block and the valve block has a large size cored passage for the pilot supply air which, in conjunction with an inlet or accumulator check valve, provides for trapping of air under pressure for operating the valves in the valve block in case of emergency, the valve block being generally rectangular in cross section with a pair of cylindrical bores therein arranged end to end for receiving the valve members of the main valves, and with the said cored passage being located between the cylindrical bores and the corners of said rectangular section.

It is another object of this invention to provide a pilot-operated solenoid valve assembly in which the valve elements in the valve block are guided at their ends against cocking or binding and to provide for free flow passages past valve heads on said elements.

It is another object of this invention to provide a solenoid operated valve assembly of the character indicated in which the valve elements in the valve block are yieldably retained in prescribed positions.

It is another object to provide a valve assembly of the type described in which the cylinder bores containing the main valve elements are arranged end to end with a dividing wall therebetween.

It is another object to provide a pilot valve controlled main valve in which the main valve has fluid pressure operated main valve elements arranged end to end and with a spring extending between said valve elements and in contact therewith for constantly urging the same toward predetermined positions.

It is another object to provide a pilot valve controlled main valve in which fluid pressure operated main valve elements are located end to end in cylindrical bores with an apertured wall therebetween, and a spring extending through the aperture and in contact with both valve elements for constantly urging the same toward predetermined positions.

It is another object to provide a valve block for housing a pair of main fluid pressure operated valve elements in which said block at one end provides a first set of bores and counterbores for receiving one of said valve elements and at the other end provides a second set of bores and counterbores for receiving the other of said valve elements and identical with said first set, said sets being divided by a wall midway between said ends whereby identical tooling may be used for boring said sets.

It is another object to provide opposed valve seat for receiving a valve poppet therebetween by a simple arrangement of clamped and sealed members.

It is an object of this invention to provide a valve assembly of the type described in which a pair of momentarily energized solenoid pilot valves control a main fluid pressure operated valve and in which a bleed passage leading from a motor port supplies pressure fluid for holding the main valve in one of its positions.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 1 is a front elevation view of a solenoid operated valve assembly embodying the present invention;

FIG. 2 is a top plan view;

FIG. 3 is a top plan view of the distributing block with the valve and solenoid blocks removed;

FIG. 4 is a top plan view of the valve block with the solenoid block removed and inverted;

FIG. 5 is a bottom plan view of the valve block;

FIG. 6 is an end elevation view of the valve block (with the end cap removed) as viewed from the right hand end of FIG. 1;

FIG. 7 is a cross-section view taken substantially along the line 7—7, FIG. 2, some of the cored passages in the distributing, valve, and solenoid blocks being shown schematically for sake of clarity of illustration;

FIG. 8 illustrates modified circuity in the base or distributing block to provide for a remote pilot connection in lieu of utilizing the fluid under pressure in the main inlet port;

FIG. 9 is a fragmentary section showing a detent mechanism in association with the outrigger bearing of each of the valve elements in the valve block; and FIG. 10 is a dual solenoid circuit.

FIG. 11 is a cross section on the lines 11—11 of FIG. 7.

Referring now more particularly to the drawings, the solenoid operated valve assembly 1 herein comprises a base or distributing block 2, a main valve block 3, and a solenoid pilot valve block 4. These blocks being secured together as by a pair of screws 5 extending through holes in the solenoid and valve blocks 4 and 3 and having threaded engagement with holes in the distributing block 2. Special molded gaskets 6 and 7 are provided between the distributing block 2 and the valve block 3 and between the valve block 3 and the solenoid block 4, as best shown in FIGS. 1, 3, 4 and 7.

The distributing block 2 has mounting holes 8 therethrough and on one side is formed with an inlet port 9, an exhaust port 10, a remote pilot port 11 which is closed by plug 12 when pressure in port 9 is used for pilot pressure, and an electric cable or conduit connection port 14. The distributing block 2 on the other side thereof is formed with a pair of outlet or motor ports 15 and 16 adapted for connection, for example, to the ports of a double acting fluid motor (not shown). As best shown in FIG. 3, the inlet, exhaust, and motor ports 9, 10, and 15 and 16 open on the top face of the distributing block 2 which register with corresponding passages 9', 10', and 15' and 16' in the valve block 3. In the opening 17 in the distributing block 2 is mounted a rubber-like female plug element 18 projecting upwardly therefrom and having leads 19, 19 extending through the cored passage 20 into the integral junction box 21.

As best shown in FIG. 11, plug element 18 has grooves 22 on opposite sides in which corresponding ribs 22' in the opening 17 are engaged to retain said element but yet permit flexing thereof. Element 18 extends into opening 28 and has clearance therewith in all lateral directions to permit such flexing. The junction box 21 has a removable cover plate 23 so that the two leads 19, 19 may be connected to the electric power supply line which is adapted to be connected to the electrical port 14.

The distributing block 2 is also provided with a threaded port 24 and passage 25 leading to the underside of an accumulator check valve 26, this port 24 being open to the pressure inlet port 9 when the source of pilot pressure is to be the same as the main inlet. However, if a remote pilot source is employed, the plug 12 may be unscrewed from remote pilot port 11 and screwed into port 24 for connection of a remote pilot source to port 11.

Referring now to the valve block 3, such valve block comprises a rectangular tubular section 3' in which there is centrally disposed a circular tubular section 3'' supported in spaced relation from the inner surface of the rectangular tubular section 3' by means of a network of longitudinal and transverse webs 3'''. The webs 3''' are preferably made integral with the rectangular tubular section 3' and circular tubular section 3'' as by casting the valve block 3. Two of the webs 3''' are disposed adjacent either end of the valve block 3, one of such webs having a semicircular configuration, as clearly shown in FIG. 6, which is preferably formed integral with the adjacent end of the circular tubular section 3'' along its entire length and is connected to the rectangular tubular section 3' at three places; and the second of such webs 3''' projecting outwardly from one side of the rectangular tubular section 3' and connecting the same to the circular tubular section 3''. These end webs 3''' are provided with a plurality of apertures for receiving suitable fasteners to secure the associated end caps 58 in place. The valve block 3, as shown in FIGS. 5 and 7, is further provided with a pressure inlet passage 9', an exhaust passage 10', and a pair of motor passages 15', 16', which register respectively with ports 9, 10, and 15 and 16 in the distributing block 2. It also has a pilot supply passage 27 which leads through the valve block 3 to the top thereof for supplying pilot air pressure to the solenoid pilot valve block 4 via the aforesaid accumulator check valve 26.

The valve block 3 is formed with a relatively large size rectangular opening 28 at the top which becomes narrower near the bottom and provides a pair of ribs 28' engageable within grooves 29' for flexible mounting of the recessed male plug element 29 in the same manner as element 18, the lower end of plug element 29 also having lateral clearance with opening 18 so as to permit sideward flexing. Element 29 has a pair of projecting contact pins 30 adapted to fit within sockets 30' of the female element 18 when the valve block 3 is mounted on the distributing block 2. The flexible mounting of elements 18 and 29 permit ready sideward yielding of one or the other to correct any slight misalignment of pins 30 with respect to sockets 30' when assembling valve block 3 to distributing block 2 and also avoids breakage of the contact pins due to strain and fatigue when the valve assembly is subject to vibration. The upper end of passage 28 is relatively large so as to accommodate slack wire which is desired for connection purposes and for ease of handling of the valve block 3 and solenoid block 4 when detached from each other.

Pilot supply passage 27 includes an enlarged chamber portion 27'' cored within the valve block 3 (see FIG. 6) to provide a relatively large volume of air under pressure for emergency operation in the event of loss of pressure in inlet port 9 or in the remote pilot port 11, as the case may be, check valve 26 serving to trap such air in chamber 27'' and passage 27.

Referring to FIGS. 4, 6, and 7, the latter shows some of the passages schematically in order to clarify the description, but in any event, the passage 27 from the accumulator check valve 26 opens in the top face of the valve block 3 to register with a corresponding passage 27' in the solenoid block 4.

The solenoid coil 35 is contained in a die cast casing 36 which is secured to the solenoid block 4 as by a pair of screws 37 at diagonally opposite corners and the armature 38 has rubber-like end portions which cooperate with seats 39 and 40 so as to constitute a pilot valve. When the solenoid 35 is deenergized, a spring 41 biases the solenoid pilot valve 38 into engagement with the seat 39. The solenoid block 4 is provided with a rotary cam member 42 by which the pilot valve 38 may be manually shifted away from the seat 39 into engagement with the other seat 40. Provision is made for mounting of the solenoid casing 36 on the other side of the block 4, or a second solenoid and casing (see FIG. 10) may be provided for a purpose later described.

The valve block 3 has a pair of substantially axially aligned bores 45, 46 which are separated by an integral web or partition 49.

First seat rings 48 are bottomed and sealed with first counterbores 48'. Second seat rings 47 are mounted and sealed within second counterbores 47' and have several projecting fingers 47'' for clamping first seat rings 47 in position. Bores 45 and 46 are identical, as are the left and right pairs of counterbores 47', 48' whereby the same tooling may be used for boring and counterboring either end of the block.

Reciprocable in each bore 45, 46 is the plunger portion 50 of a valve element 51. The web 49 has an opening 52 through the center thereof through which extends the coil spring 53 which tends to yieldably urge the valve elements 51 apart with the outboard sides of the respective valve heads 54 in engagement with the outboard ring seats 47. When the plunger portions 50 are urged toward each other, the inboard sides of the valve heads 54 engage the respective inboard seat rings 48. Moreover, each valve element 51 has an outer stem portion 56 guided in a bearing 57 having a hexagonal or like non-circular guide recess formed in the associated end cap 58, end caps 58 also serving to retain seat rings 47 in their respective counterbores. By guiding the valve elements 51 by means of outer stem portions 56 the valve heads 54 may be free of radial contact with any supporting surfaces so as to provide an annular chamber therearound which permits unobstructed flow of fluid around said valve heads between passages 15', 16' and one or the other of the respective seat rings 47, 48. Pressure supply branch 9'' intersects left counterbore 47' outward of the respective ring 47 and pressure supply branch 9''' intersects right bore 46 inward of the respective seat ring 48.

As is now evident, when the solenoid 35 is deenergized and the solenoid pilot valve 38 is in engagement with the seat 39, air under pressure in the inlet port 9 flows through the pilot port 24 and passage 25 and check valve 26 and through the passages 27 and 27' into the chamber 60 of the solenoid casing 36, and thence flows through the opening 61 in the right-hand seat 40 around the solenoid armature or pilot valve 38, and through the registering passages 62 and 63 in the solenoid block 4 and valve block 3 to reach the chamber 64 extending between left piston 51 and web 49 and then through opening 52 to reach chamber 64' extending between web 49 and right piston 51. Such pilot pressure acting on the areas of the ends of the plunger portions 50 urges the valve elements 51 axially apart to maintain the outboard sides of valve heads 54 in engagement with the outboard seat rings 47.

The inlet pressure in port 9 also reaches the chamber 65 at the left via the passage 9'' of the valve block 3, but since that pressure is acting on an area of valve head 54 which is smaller than the area of plunger 50 being acted on by pressure in chamber 64, the left valve element 51 will remain in seated position as shown. At the same time, the inlet pressure enters passage 9''' and flows through the open seat ring 48 of the right-hand valve assembly to passage 16' and cylinder port 16. Thus, in the case of a double acting pneumatic cylinder, the piston therein will be moved in one direction when the solenoid 35 is deenergized. The other cylinder port passages 15 and 15' are open to exhaust passage 10' and port 10 through left-hand seat ring 48 and passages 67, 68 and chamber 69.

Now, when the solenoid 35 is energized, the pilot valve 38 will be pulled toward the right to close valve seat 40 and thus shut off pressure passage 61. At the same time, valve seat 39 is opened to permit exhausting of fluid from chambers 64 and 64' through passages 62, 70, 67, 68 and 69. Since there is no pressure in chamber 64 acting on the plunger portion 50 of the left-hand valve element 51, inlet pressure in chamber 65 on the area of the left valve element 54 will urge the left valve element to the right causing sealing of the opening through the right inboard seat 48, whereupon air pressure can now flow from the inlet 65 through left seat ring 47 to passage 15' and to cylinder port 15 to actuate the piston in the pneumatic cylinder in the opposite direction. At the same time, with no pressure in chamber 64, pressure from passage 9''' acting on the right side of the plunger portion 50 of the right element 51 urges it to the left to seat right valve element 51 on right seat ring 48 to close the opening therethrough and to block communication between the inlet passage 9''' and the cylinder passage 16' and to open communication via right seat ring 47 between cylinder passage 16' and exhaust chamber 69.

When the valve is not operating and no pressure is being supplied to inlet port 9, spring 53 urges the plungers 50 outwardly so that left valve element 54 is seated on left seat ring 47 and right valve element 54 is seated on right seat ring 47 and the valves remain so seated until pressure is applied to port 9 to operate the valves as aforesaid. Without the spring 53, the valve elements might move to intermediate positions between the respective seat rings 47, 48 due to vibration or other causes. In such case when pressure fluid is applied to port 9 it might pass from port 9'' through left hand seat ring 47, around left valve element 54 through left seat ring 48 to exhaust port 67 and/or from port 9''' through right seat rings 48 and 47 to exhaust chamber 69 and thus cause the valve elements 54 to hang up and fail to move one way or the other for proper functioning.

In lieu of the spring 53 between the plungers 50 for biasing the valve elements 51 apart, spring detents 75 in the form of C-shaped spring members may be provided and having straight leg portions 76 engaging one or the other of two grooves 78 in the respective stem portions 56 to hold the valve elements in one or the other of their seated positions.

FIG. 10 illustrates a modification employing two solenoids 85 and 89 which may be but momentarily energized for causing reciprocation of the valve elements 51. This modification omits connection of passage portion 27' to chamber 60 of FIG. 7 and substitutes passage portion 27''' for connecting passage 27 directly to solenoid plunger chamber 38'. Passage 62 is omitted and passage 87 leads from valve 39 to passage 63 and thence to chambers 64 and 64'. Passage 70 of FIG. 7 is also omitted and in lieu thereof a passage 92 connects exhaust chamber 67 to passage 91 and another valve seat 93 controlled by a second solenoid plunger 94 normally seated by spring 95. A passage 90 connects solenoid chamber 96 with passage 63, and passage 86 connects cylinder passage 16' with chamber 64 and, by means of opening 52, with chamber 64'.

Momentary energization of solenoid 85 opens valve seat 39 to permit pressure fluid to flow from pressure feed passage 27 through passage 27'', solenoid chamber 38', seat 39, and passages 87 and 63 to chambers 64 and 64' to move valve elements 51 axially apart. The valve elements are then held in such separated position by detents 75 and by pressure fed to chambers 64 and 64' through bleed passage 86 from then pressurized passage 16' despite deenergization of solenoid 85 and closing of valve seat 39 by solenoid plunger 38 due to spring 41.

When solenoid 89 is energized momentarily, chambers 64, 64' and passage 63 are communicated with exhaust pasage 67 via passages 90, 91 and 92 by opening of valve seat 93 whereby the valve elements 51 are pressure urged axially toward each other. Upon deenergization of solenoid 89 and consequent closing of seat 93, valve elements 51 are retained in their position toward each other by inlet pressure and detents 75, as previously explained. In this latter position cylinder passage 16' is connected to exhaust passage 69 rather than to pressure inlet passage 9''' and thus no pressure is fed to chambers 64, 64' through passage 86. It is understood that passage 86 is of smaller flow capacity than the exhaust passages leading from chamber 64 through the pilot valve associated with solenoid 89 whereby pressure may be exhausted from chamber 64 through such pilot valve faster than it may enter through passage 86 while cylinder passage 16' is in comunication with pressure passage 9'''.

While not shown herein, the leads 95 in FIG. 4 terminate in a female plug element for engagement by an integral male plug element of the solenoid coil 35 (and solenoid coils 85 and 89 as well) for ease of detachment for replacement or servicing of the pilot valve 38 or the coil itself.

While certain embodiments of the invention are illustrated and described it is obvious that many modifications may be made without departing from the scope of the invention as defined by the claims.

We claim:

1. A valve block having passages for flow of fluid and two bores for valve elements; valve elements axially slidable in the respective bores toward and away from one another; each valve element comprising a plunger portion at one end for fluid pressure actuation in one direction, a stem portion at the other end axially guided in said valve block, and an intermediate valve head; axially spaced apart seats in said valve block straddling the respective valve heads for alternate engagement by the latter upon movement of said valve elements in opposite directions; and means providing relatively restricted fluid communication between said bores whereby fluid under pressure in one bore acting on the plunger portion of one valve element actuates the latter more rapidly than fluid pressure acting on the plunger portion of the other valve element via such restricted fluid communication.

2. The valve block of claim 1 wherein detent means in said valve block cooperate with said stem portions to axially yieldably retain each valve head alternately in engagement with said seats that straddle the same.

3. A valve block having passages for flow of fluid and two bores for valve elements; valve elements axially slidable in the respective bores toward and away from one another; each valve element having a plunger portion for fluid pressure actuation in one direction and having a valve head spaced from said plunger portion, axially spaced apart seats in said valve block straddling the respective valve heads for alternate engagement by the latter upon movement of said valve elements in opposite directions, and yieldable means for retaining said valve elements in at least one axial position in which they are farthest away from one another and in which fluid under pressure between them and acting on said plunger portions also retains them in said one axial position.

4. The valve block of claim 3 wherein said yieldable means comprises a single spring means between and engageable with the respective valve elements.

5. The valve block of claim 3 wherein said bores are substantially coaxial and allochiral with a perforate web therebetween, said web affording relatively restricted fluid communication between said bores whereby fluid under pressure in one bore acting on the plunger portion of one valve element actuates the latter more rapidly than fluid pressure acting on the plunger portion of the other valve element via such restricted fluid communication.

6. The valve block of claim 3 in which said bores are substantially coaxial and allochiral with a perforate web therebetween, said web affording relatively restricted fluid communication between said bores whereby fluid under pressure in one bore acting on the plunger portion of one valve element actuates the latter more rapidly than fluid pressure acting on the plunger portion of the other valve element via such restricted fluid communication, and said yieldable means comprises a single spring extending through said perforate web and in engagement with said valve elements.

7. A valve block having a bore, first and second counterbores, and a plurality of passages communicating with the exterior thereof, a valve element having a plunger portion located within said bore for fluid pressure actuation and having a valve head axially spaced from said plunger portion, a first seat ring bottomed in said first counterbore and having a flow port therethrough and a second seat ring mounted in said second counterbore and having a flow port therethrough, said seat rings providing axially spaced apart valve seats surrounding the respective flow ports through said seat rings and forming therebetween a valve chamber, said valve head being within said chamber and alternately seatable on said seats for controlling flow of fluid between the respective flow port and said chamber, at least one of said passages leading to said chamber, said chamber providing an annular space completely around said valve head so as to permit unobstructed communication between said one passage and whichever flow port is open.

8. A valve block in accordance with claim 7 in which said second seat ring has a projection engageable with said first seat ring for anchoring the same within said first counterbore.

9. A valve block in accordance with claim 7 in which said second seat ring has a projecting portion for clamping said first seat ring in said first counterbore, and a cap closing said second counterbore for retaining said second seat ring therein, said cap having a bearing portion receiving a stem extension on said valve element for guiding the same.

10. In a solenoid operated valve assembly, the combination of a distributing block having ports for connection of fluid pressure supply and distribution lines and an electric power supply line and passages opening in one face of said block for flow of fluid and for electric leads terminating in a first plug element at such face having a portion thereof projecting laterally from such face; a valve and solenoid block assembly detachably secured to such one face of said distributing block having passages registering with those of said distributing block for flow of fluid and for electric leads through said block assembly having at one end a complemental second plug element inset in its passage in said block assembly and engageable with said first plug element when the projecting portion thereof is inserted in the passage in which said second plug element is inset; said block assembly comprising fluid actuated valve elements therein to selectively communicate said fluid ports with one another; said block assembly having a solenoid therein to which the other end of said electric leads are operatively connected, and a solenoid armature movable therein upon energization and deenergization of said solenoid; said armature constituting a movable valve member for controlling fluid pressure actuation of said valve elements via passages in said block assembly registering with passages in said distributing block; at least one of said plug elements being capable of lateral aligning movement with respect to the other in the passage in which said second plug element is inset to minimize strain on the interengaging portions thereof and thus to enhance fatigue life thereof insofar as vibration and repeated assembly and disassembly of said valve block and distributing block are concerned.

11. The valve assembly of claim 10 wherein said block assembly comprises a valve block and a solenoid block detachably secured together; and wherein electric lead passages in said valve block and solenoid block are arranged to accommodate slack in said leads to facilitate disassembly and servicing of said valve block and said solenoid block without disengaging said first and second plug elements.

12. In a solenoid operated valve assembly, the combination of a distributing block having ports for connection of fluid pressure supply and distribution lines and an electric power supply line and passages opening in one face of said block for flow of fluid and for electric leads terminating in a first plug element at such face; a valve and solenoid block assembly detachably secured to such one face of said distributing block having passages registering with those of said distributing block for flow of fluid and for electric leads through said block assembly having at one end a complemental second plug element engageable with said first plug element; said block assembly comprising fluid actuated valve elements therein to selectively communicate said fluid ports with one another; said block assembly having a solenoid therein to which the other end of said electric leads are operatively connected, and a solenoid armature movable therein upon energization and deenergization of said solenoid; said armature constituting a movable valve member for controlling fluid pressure actuation of said valve elements via passages in said block assembly registering with passages in said distributing block; at least one of said plug elements being capable of lateral aligning movement with respect to the other to minimize strain on the interengaging portions thereof and thus to enhance fatigue life thereof insofar as vibration and repeated assembly and disassembly of said valve block and distributing block are concerned; a check valve in the passage leading from said distributing block and through said block assembly, said check valve, in the case of compressible fluid, trapping fluid in said passage for fluid pressure actuation of said valve elements despite loss of fluid pressure upstream of said check valve; the portion of the passage upstream of said check valve having ports opening in the fluid pressure supply port of said distributing block and in another face of the latter whereby plugging of the latter leaves the former in fluid communication with said fluid pressure supply port and plugging of the former leaves the latter available for connection with another fluid pressure source.

13. A skeletonized valve assembly comprising a valve block of rectangular tubular section in which there is disposed a generally circular tubular section, said circular tubular section being supported in spaced relation from the inner surface of said rectangular tubular section by means of radial and transverse webs integrally connecting said sections, said circular tubular section providing two bores for valve elements axially slidable in the respective bores toward and away from one another, the spaces between said rectangular and circular tubular sections constituting passages that open at a face of said block in an inlet port for fluid under pressure, motor ports for connection with a fluid motor, and an exhaust port, said passages extending through said circular tubular section for fluid pressure actuation of said valve elements and for selective communication of said inlet and exhaust ports with said motor ports.

14. The valve assembly of claim 13 in which there is a transverse web within said circular tubular section separating said bores, said transverse web having an opening therethrough communicating said bores with each other.

15. The valve assembly of claim 13 in which a distributing block with corresponding inlet, motor, and exhaust passages is detachably secured to said one face and a solenoid operated pilot valve for controlling actuation of said valve elements is attached to another face of said valve block and in which a flow passage is provided through said distribution and valve blocks for directing fluid under pressure to said pilot valve, said flow passage including a check valve and an enlarged chamber between said circular and rectangular tubular sections downstream of said check valve for accumulating fluid under pressure in sufficient volume to actuate said valve elements in the event of pressure loss upstream of said check valve.

16. A valve assembly comprising a valve body having a fluid inlet port, an exhaust port, and a motor port, a fluid pressure operated valve element in said body for controlling flow of fluid between said ports, means for directing fluid under pressure to one side of said valve element, said body including a pressure chamber for directing fluid under pressure to another and larger side of said valve element for actuating the same in opposition to the fluid pressure acting on said one side, a pilot pressure passage for connecting said inlet port to said chamber, a pilot exhaust passage leading from said chamber, a first solenoid operated pilot valve operable for momentarily opening said pilot pressure passage to direct fluid under pressure into said chamber to actuate said valve element into a first position for connecting said inlet port to said motor port, a second solenoid operated pilot valve for momentarily opening said pilot exhaust passage for exhausting said pressure chamber to permit movement of said valve element by fluid pressure acting on said one side thereof to a second position for connecting said motor port to said exhaust port, a bleed passage connecting said motor port to said chamber for pressurizing the same when said motor port is connected to said inlet port to hold said valve element in said first position upon closing of said first pilot valve after said momentary opening thereof, said bleed passage being of smaller flow capacity than said pilot exhaust passage whereby pressure fluid will exhaust from said chamber upon momentary opening thereof faster than it will enter said chamber through said bleed passage to permit movement of said valve element to said second position.

17. A valve assembly comprising a valve body having a fluid inlet port, an exhaust port, and a motor port, a fluid pressure operated valve element for controlling flow of fluid between said ports, means for urging said valve element to one position in which said motor port is connected to said exhaust port and is closed to said inlet port, said body including a pressure chamber for directing fluid under pressure to said valve element for actuating the same in opposition to said urging means to another position in which said motor port is connected to said inlet port and is closed to said exhaust port, a pilot pressure passage for connecting said inlet port to said chamber, a pilot exhaust passage leading from said chamber, a first solenoid operated pilot valve operable for momentarily opening said pilot pressure passage to direct fluid under pressure into said chamber to actuate said valve element into said another position, a second solenoid operated pilot valve for momentarily opening said pilot exhaust passage for exhausting said pressure chamber to permit said urging means to move said valve element to said one position, a bleed passage connecting said motor port to said chamber for pressurizing the same when said motor port is connected to said inlet port to hold said valve element in said another position upon closing of said first pilot valve after said momentary opening thereof, said bleed passage being of smaller flow capacity than said pilot exhaust passage whereby pressure fluid will exhaust from said chamber upon momentary opening thereof faster than it will enter said chamber through said bleed passage to permit movement of said valve element to said one position.

18. In a solenoid valve assembly, a first housing member having a fluid port and a first opening both intersecting one face of said housing member, an electrical terminal plug secured in said opening against longitudinal movement therein and having a portion projecting laterally from such face, a second housing member having a fluid port and a second opening, both intersecting one face of the second housing member, an electrical terminal plug inset in said second opening and secured against longitudinal movement therein, said faces being engageable with said ports and said openings being in respective alignment, said plugs having complemental male and female portions engageable with each other when said faces are engaged and when said projecting portion of the first-mentioned plug is inserted in said second opening at least one of said plugs having lateral clearance in its opening so as to be capable of lateral movement for correcting misalignment of said male and female portions when said ports are in register with each other, and in the case of said plug having clearance in said first opening, said projecting portion thereof also has lateral clearance in said second opening.

19. The valve assembly of claim 18 in which said lateral clearance extends throughout the major portion of the length of said one plug.

References Cited in the file of this patent

UNITED STATES PATENTS

| | | |
|---|---|---|
| 1,000,101 | Marx | Aug. 8, 1911 |
| 2,539,913 | Koepcke | Jan. 30, 1951 |
| 2,739,613 | Kulikoff | Mar. 27, 1956 |
| 2,775,982 | Canfield | Jan. 1, 1957 |
| 2,821,355 | Hicks | Jan. 28, 1958 |
| 2,952,246 | Collins | Sept. 13, 1960 |
| 2,999,998 | Cole | Sept. 12, 1961 |
| 3,035,611 | Collins | May 22, 1962 |
| 3,062,236 | Ludwig | Nov. 6, 1962 |

FOREIGN PATENTS

| | | |
|---|---|---|
| 82,856 | Switzerland | Nov. 1, 1919 |
| 807,731 | Germany | July 2, 1951 |